United States Patent

[11] 3,630,472

| [72] | Inventor | Carl Evert Axenborg<br>Linkoping, Sweden |
|---|---|---|
| [21] | Appl. No. | 52,412 |
| [22] | Filed | July 6, 1970 |
| [45] | Patented | Dec. 28, 1971 |
| [73] | Assignee | Saab-Scania Aktiebolag<br>Linkoping, Sweden |
| [32] | Priority | July 7, 1969 |
| [33] | | Sweden |
| [31] | | 9575/69 |

[54] PROTECTION DEVICE FOR OCCUPANT OF AIRCRAFT EJECTION SEAT
4 Claims, 6 Drawing Figs.

[52] U.S. Cl. .................................................. 244/122,
244/121, 280/150
[51] Int. Cl. .......................................................... B64d 25/04
[50] Field of Search ........................................... 244/122,
122.18, .2, 121; 280/150, 150 SB, 150 AB;
296/63; 297/385, 427

[56] References Cited
UNITED STATES PATENTS

| 2,418,798 | 4/1947 | Whitmer | 244/121 |
| 2,477,933 | 8/1949 | Labser | 296/84 |
| 3,202,384 | 8/1965 | Martin | 244/122 |
| 3,287,064 | 11/1966 | Freeman | 244/122 |
| 3,510,150 | 5/1970 | Wilfert | 280/150 |

Primary Examiner—Milton Buchler
Assistant Examiner—Carl A. Rutledge
Attorney—Ira Milton Jones ABSTRACT: In an aircraft having an ejection seat and having a recess in its cabin defined by an overhanging wall, a collapsed bladder is arranged in the recess to provide an unobtrusive cushion for normal flight. The bladder is rapidly inflated just prior to ejection, whereupon it forcefully displaces the seat occupant's limb to a position safe for ejection and fills the recess to prevent the airman from inserting a body member thereinto. Quick inflation expedients are disclosed, operable in an automatic ejection sequence.

Patented Dec. 28, 1971

Inventor
Carl Evart Axenborg
By
Attorney

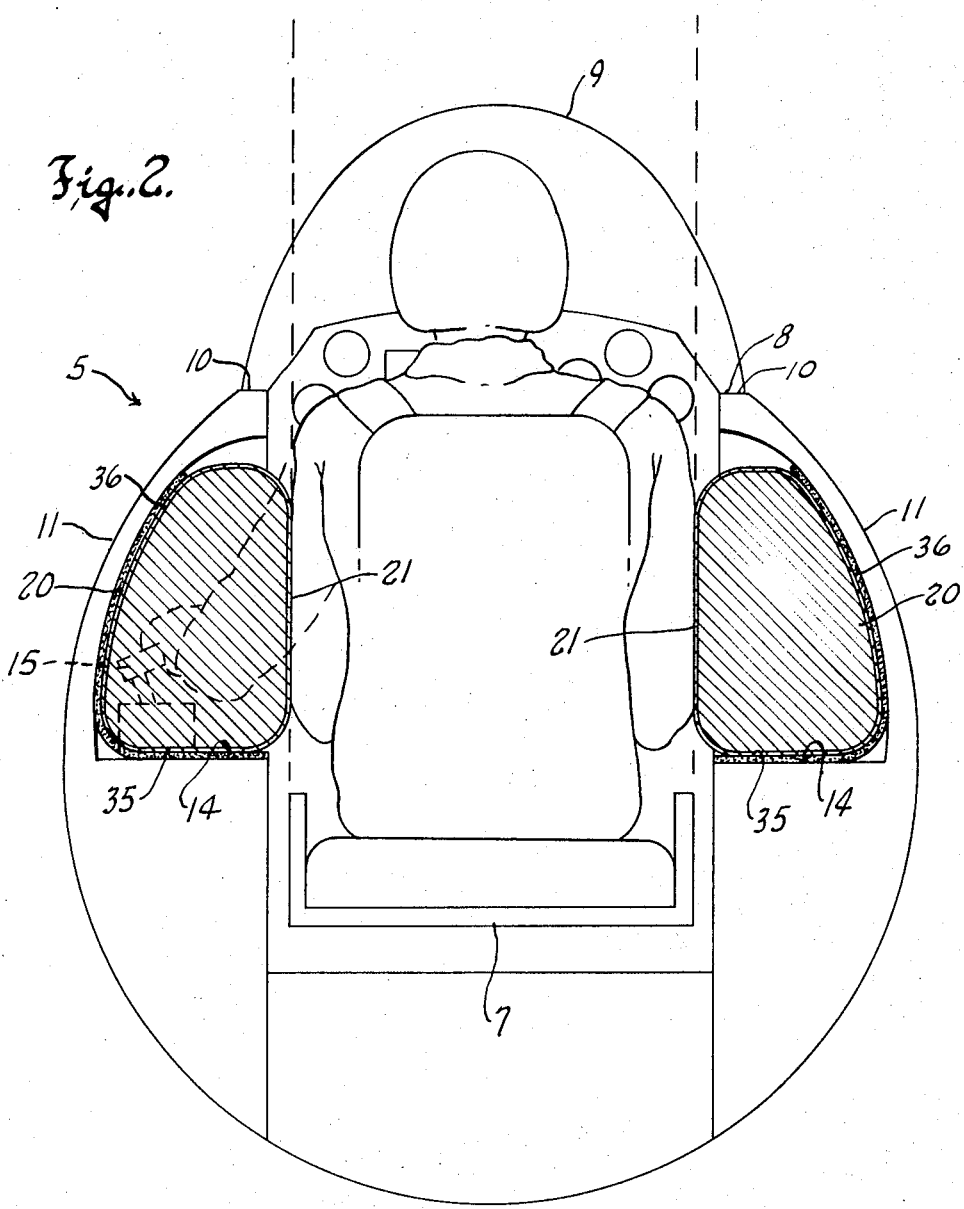

PROTECTION DEVICE FOR OCCUPANT OF AIRCRAFT EJECTION SEAT

This invention relates to protection equipment for the occupants of aircraft ejection seats, and more specifically to means for so positioning the limbs of an ejection seat occupant during ejection as to insure their safely clearing all parts of the aircraft structure.

Various expedients have been suggested for confining or positioning the arms of an ejection seat occupant during emergency ejection, so as to avoid the possibility that he will be injured by an counter with a part of the aircraft structure as the seat moves out of the aircraft. One device heretofore proposed consisted of a harnesslike arrangement of lines which were connected to the airman's arms whenever he occupied the ejection seat. The lines ere also connected with the fixed aircraft structure, in an arrangement such as that the initial motion of the seat during ejection drew the airman's arms to safe positions close to his body, where they were held until after he had been propelled to some distance from the aircraft and was separating from the ejection seat. A device of this general character is disclosed, for example in U.S. Pat. No. 3,074,669 to N. I. Bohlin.

It has also been proposed to arranged netlike restrainers at opposite sides of an ejection seat, cooperating with sheaves or the like that were movably mounted on the seat at opposite sides of the airman, to restrain his arms so that they would not be moved laterally outwardly by the force of slipstream encountered as he left the aircraft. However, such devices were found to have an unfavorable effect upon the airflow around the ejected seat and airman, so that the seat-airman combination became unstable. For this reason such devices have not been used in practice.

All of the arms protection devices heretofore put into actual use have possessed the common characteristic of being actuated in consequence of relative motion between the ejection seat and the aircraft, and they all had the disadvantage, therefore, that no movement of the airman's arms began to take place until the seat had traversed at least an initial part of its ejecting motion. As a result, such devices had to cause a relatively rapid and abrupt positioning of the airman's arms to insure that they would occupy the desired positions before the seat could move through any substantial distance relative to the aircraft.

A more serious disadvantage of devices of the type that are actuated by relative motion of the seat arises in connection with aircraft having tandem seating arrangements. Most ejection seats are now equipped with auxiliary rocket engines which are ignited just before the seat leaves the aircraft and which discharge flaming gases rearwardly and downwardly. Where aircrew members are seated in tandem, it is mandatory that the screw members eject in sequence from rear to front, for otherwise a crew member could be severely burned by the rocket motor gases from the ejection seat of a crew member in front of him. Since ejection may be initiated by any one of the crew members, and he may not have the means or opportunity to notify others that ejection is about to take place, it is essential that any device for positioning the limbs of an airman for seat ejection should be of such character that it will work successfully even with an airman who is completely unprepared for its operation.

With the foregoing in mind, it is a general object of this invention to provide means for rapidly and forcefully but gently moving the limbs of an airman to positions in which they will be safe for seat ejection, and for completing such positioning of his limbs before his ejection seat begins to move relative to the aircraft.

For an appreciation of the more specific objects of the invention it should be pointed out that the cabin of a military aircraft in which an ejection seat is mounted usually has an opening or hatch at its top which is normally used for aircrew entry and egress and which in normal flight is closed by a canopy. As a rule this hatch opening is only slightly wider than the ejection seat, and from its edges the walls of the cabin diverge downwardly and outwardly. At each side of the ejection seat, at about the level of its arms, where the cabin is widest, there is a horizontal shelf which extends lengthwise of the cabin and inwardly from the sidewall. This shelf serves as an arm rest for the airman, and on it are mounted a throttle lever, switches and other controls which should be readily accessible to the airman's hands. Hence the airman's forearms are normally in pocketlike zones above the shelves and are beneath the upwardly and inwardly convergent cabin walls that overhang the shelves, in positions to strike those walls if the airman is moved upwardly without having his arms displaced inwardly toward his body. As a result, his arms could be torn off or crushed between the ejection seat and the edge of the hatch opening as the ejection seat emerged from the cabin.

If the airman were to be prepared for ejection by forcing his forearms out of these recessed zones with a pure laterally inward motion, ejection still might not be accomplished with complete safety to the airman. As pointed out above, ejection may occur without warning to the airman, and this means that preparatory displacement of his forearms out of the armrest zones can occur at a time when his hand or wrist is at the outer side of a throttle lever or similar obstructing control member, so that a purely lateral motion of his forearm could occasion serious injury to him as his hand, wrist or forearm was forced inward against the obstruction.

With these considerations in mind, it is another object of this invention to provide an arm protection device for an airman occupying an ejection seat whereby the airman's arms are moved inwardly to a safe position within the boundaries of the ejection seat proper before the seat begins to move in its ejecting motion, and whereby the forearms are moved upwardly to raise them clear of throttle levers and similar obstructions before they are displaced inwardly.

It is also an object of this invention to provide means operative directly prior to the beginning of ejecting motion of an aircraft ejection seat, for filling pocketlike recesses in the aircraft cabin that are adjacent to the ejection seat, to present smooth, relatively flat surfaces adjacent to the path of ejecting motion whereby the seat occupant is prevented from inserting any part of his body into one of the recesses and thereby incurring the risk of encountering fixed structure of the aircraft as the seat carries him upwardly.

It is also an object of this invention to provide an emergency device of the character described which offers no inconvenience to the airman in normal flight conditions but which, on the contrary, is adapted to provide a comfortable cushioning or padding for him, and which , moreover, does not require that any substantial change or modification be made in the aircraft cabin structure or configuration.

With these observations and objectives in mind, the manner in which the invention achieves its purpose will be appreciated from the following description and the accompanying drawings, which exemplify the invention, it being understood that such changes in the specific apparatus disclosed herein may be made as come within the scope of the appended claims.

The accompanying drawings illustrate several complete examples of the embodiments of the invention constructed according to the best modes so far devised for the practical application of the principles thereof, and in which:

FIG. 2 is a view in cross section through the cabin of an aircraft equipped with protection devices of this invention, which are shown in their operative (ejection) conditions;

Figure 1:
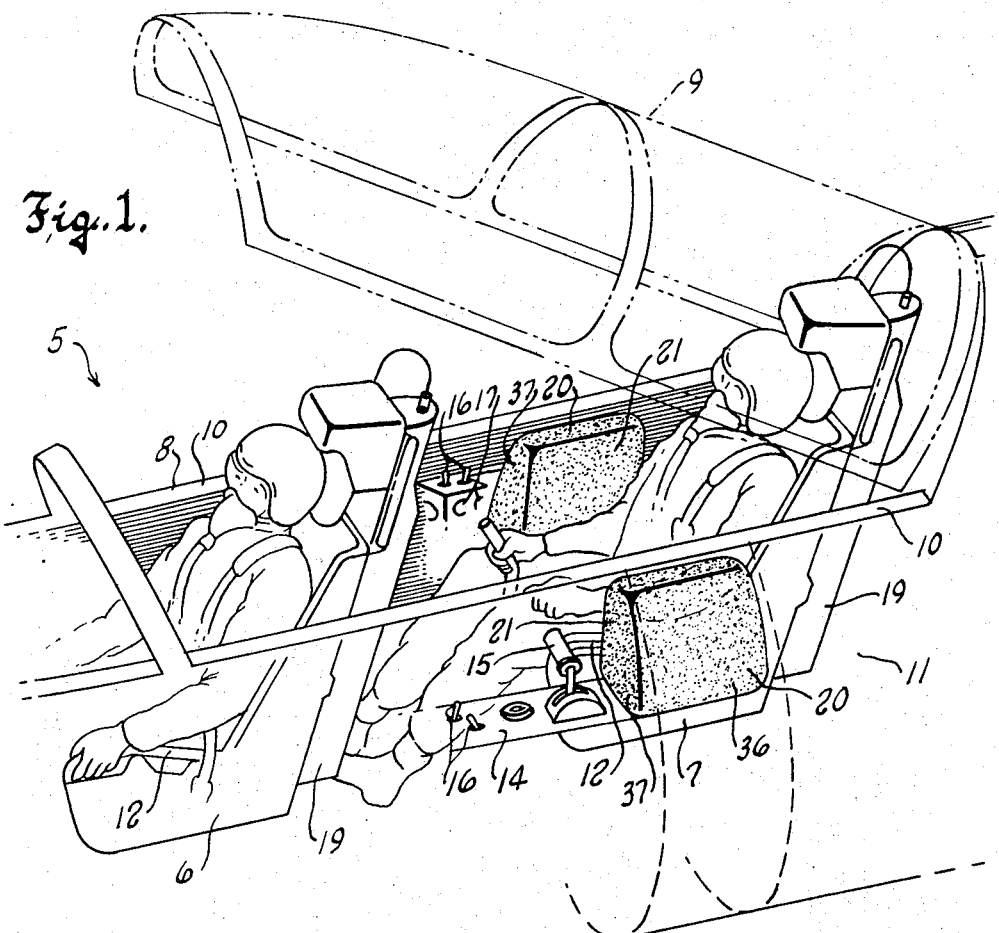
FIG. 1 is a perspective view of the cabin of an aircraft having a tandem arrangement of ejection seats for crew members, which aircraft is equipped with protection devices embodying the principles of this invention, all conditions depicted in the figure being those for normal flight.
Figure 3:
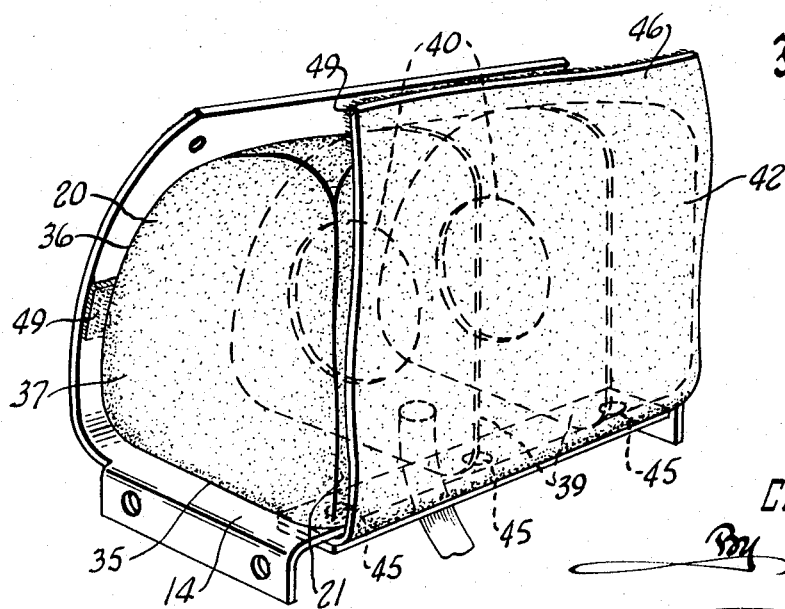
FIG. 3 is a perspective view of a protection device of this invention in its operative condition, shown in relation to its adjacent part of the cabin.

Referring now to the accompanying drawings, the numeral 5 designates generally the cabin portion of an aircraft that is equipped with a pair of ejection seats 6 and 7 arranged in tandem. As in many high performance aircraft, the cabin as a generally circular or elliptical cross section and has an opening or hatch 8 at its top, used for normal ingress and egress by the aircrew and normally closed in flight by a canopy 9. For normal opening and closing, the canopy 9 slides back and forth on lengthwise extending rails 10 along opposite sides of the hatch opening. In an emergency the canopy is adapted to be freed from the rails by a detonating release mechanism of known type, so that it will be quickly carried away by the slipstream.

The space between the rails 10 is only slightly wider than an ejection seat, and the walls 11 of the cabin diverge downwardly from it so that the cabin is widest at about the level of the arm rests 12 of the ejection seats.

In this widest part of the cabin, at each side of each ejection seat, the aircraft structure has a horizontal shelf 14 of sheet metal which extends laterally across the distance between the ejection seat and the adjacent cabin wall. The airman normally rests his forearms on these shelves, and they provide a mounting or console for a throttle lever 15, various switches 16, radio equipment knobs 17 and other controls which should be readily accessible to the airman's hand.

NOte that each of the shelves 14 cooperates with the cabin wall portion that extends upwardly and laterally inwardly therefrom to define a recess or pocketlike zone in which the airman's forearms are normally located. If the airman were subjected to bodily upward motion (as during seat ejection) while his arms were in these zones, his forearms would of course encounter the overhanging portions of the cabin wall 11 that are adjacent to the canopy rails 10.

When emergency ejection takes place, initial upward propulsion of the seat is usually effected by a catapult gun 19 comprising telescoped tubes extending generally vertically along the back of the seat and which are forced apart by pressure gas generated by detonation of a powder charge within the gun. While still in the aircraft the seat is guided in its motion by rails (not shown) which are inclined rearwardly and upwardly and which are fixed to the aircraft structure. In addition to the catapult gun, and ejection seat is now usually equipped with an auxiliary rocket motor (not shown) which is located below the pan of the seat and which is ignited shortly before the telescoped tubes of the catapult gun have fully separated.

With this powerful propulsion system, an airman can eject at ground level and be propelled high enough so that his parachute can fully deploy and then check his speed to one that is safe for a normal parachute landing. Hence it is apparent that once seat ejection begins, the airman does not have sufficient time to withdraw his arms from the recesses over the shelves 14 by voluntary action, even when he is not being subjected to sideward acceleration forces that might hamper his doing so.

In accordance with the present invention, the recess conjointly defined by each shelf 14 and its overhanging cabin wall portion is filled, just prior to the beginning of ejection seat motion, by a rapidly inflatable bladder or baglike cushion 20. As explained hereinafter, when the bladder is being inflated, it forces the airman's forearm upwardly above the throttle lever 15 and other obstructions that might project up from the shelf and then displaces the forearm gently but rapidly and firmly inward, off of the shelf and to a position alongside the airman's body. When fully inflated, each bladder presents a smooth, substantially vertical wall surface 21 which extends upwardly from near the inner edge of the shelf 14 to near the canopy rail 10 thereabove, and which thus prevents the airman from inserting any part of his body into the recess beneath the overhanging cabin wall portion.

One of the bladders or cushions 20 is located at each side of each ejection seat, so that during ejection each airman moves up between a pair of inflated bladders which thus effectively confine him within a width no greater than that of the hatch opening 8.

When collapsed, as they normally are (see FIG. 4), the bladders 20 provide comfortable pads or cushions for the seat occupant's forearms. Each bladder extends forwardly from near the occupant's elbow to the neighborhood of his wrist, so that only the forearm proper is normally ever in contact with the bladder and the bladder does not interfere with access to controls on the shelf, which are in the neighborhood of the occupant's hand, forward of the bladder. If desired, the shelf can be made with a depression or recess in which the collapsed bladder is partially received, so that it does not project too high above the level of the console portion of the shelf.

Figure 4:
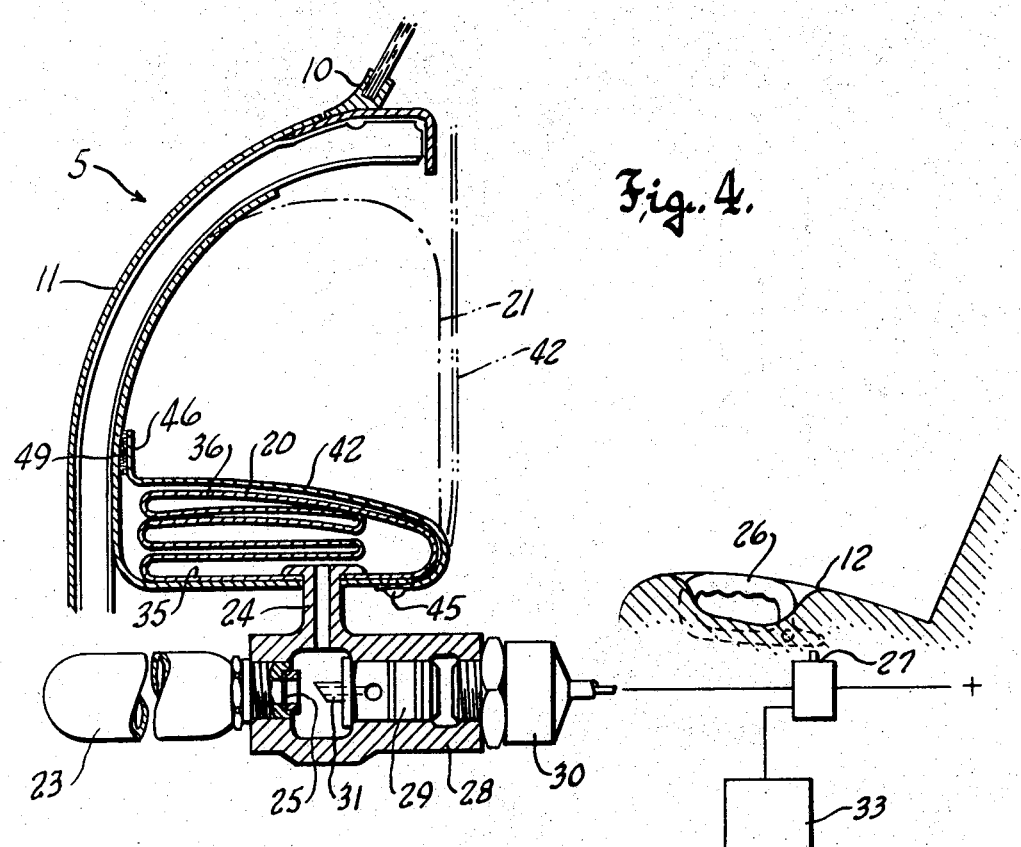
FIG. 4 is a more or less diagrammatic view in cross section of the protection device and its actuating means, shown in relation to apparatus for controlling the ejection sequence.
Figure 5:
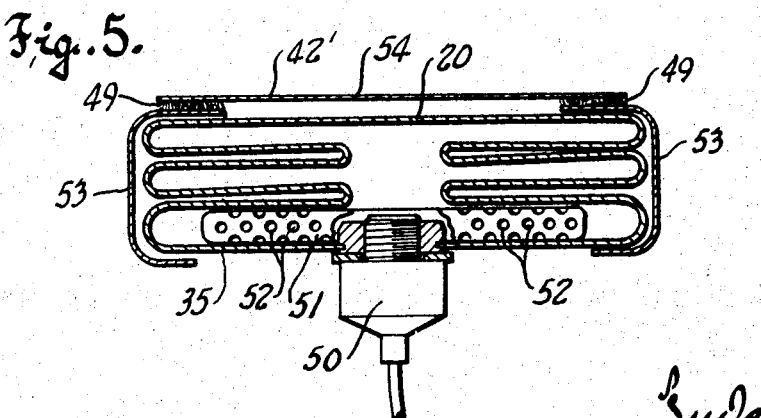
FIG. 5 is a sectional view of a modified embodiment of the invention.

Each of the bladders is connected with a pressure gas source, but of course pressure gas is not permitted to inflate the bladder until seat ejection is imminent. In FIG. 4 the pressure gas source is illustrated as a bottle 23 filled with gas such as $CO_2$ under pressure and connected with the bladder through a T-fitting 24. A rupturable seal 25 normally closes the mouth of the bottle to prevent pressure gas from flowing out of it into the bladder. In FIG. 5 the pressure gas source is illustrated as a cartridge 26 filled with a combustible solid material which rapidly generates a large volume of pressure gas when ignited.

Each of the ejection seats in the aircraft is proved with a manual ejection control, illustrated as comprising a handle 26 which is mounted on the arm rest 12 of the ejection seat and which the seat occupant swings upward when he desires to initiate emergency escape. Actuation of the handle 26 on any one of the seats starts an automatic sequence of operations, the first step in which is a jettisoning of the canopy 9, to open the hatch 8 for seat ejection, and a substantially simultaneous rapid inflation of all of the protective bladders or cushions 20 to prepare the crew members for ejection by disposing their arms in safe positions. Inflation of the bladders takes no longer than jettisoning of the canopy, and can be accomplished in a time interval as short as half a second.

Upon jettisoning of the canopy the rearmost ejection seat catapult gun is actuated, and, after its rocket gas blast is clear of the aircraft, each of the other crew members is similarly ejected in turn, from rear to front.

This sequence of events is controlled automatically by the apparatus illustrated in FIG. 4.

One branch of the T-fitting 24 comprises a connection to the pressure gas bottle 23, and its opposite branch comprises a small pressure gas cylinder 28 in which a pistonlike plunger 29 is slidable and to which a small ignitable cartridge 30 is fitted. Actuation of the ejection handle 26 closes a switch 27 that connects the ignitable cartridge 30 with a battery or other electric power source. The gases generated by ignition of the cartridge 30 drive the plunger 29 toward the mouth of the pressure gas bottle. A punch 31 on the plunger punctures the frangible seal 25 across the mouth of the bottle 23, releasing he pressure gas from it to flow into the bladder, which is of course connected with the third branch of the T-fitting 24.

Closure of the switch 27 also effects ignition of detonators in a canopy release mechanism designated by 33. The mechanism 33 provides for a time delay interval of short duration - just sufficient to insure canopy jettisoning and bladder inflation - and then it sends an impulse signal to mechanism 34 for initiating ejecting propulsion of the rearmost ejection seat. Each ejection seat, as it passes a certain point in its ejecting motion, sends an ignition impulse to the propulsion mechanism of the ejection seat ahead of it, apparatus or this purpose being known in the art.

Each bladder 20 is made of a relatively tough, supple and substantially gastight material. However, after the airman's forearm is ejected from the recess or pocketlike zone above the shelf 14, no real exertion of power upon the arm is required, and therefore, to reduce the friction of the vertical bladder wall 21 upon the airman's suit, the material of the bladder can be made somewhat porous, or other provision can be made for a slow leakage of gas out of the bladder.

Each bladder, when inflated, has a shape, in cross section, which generally conforms to the shape of the recess that it fills. It has a flat bottom wall 35 which flatwise overlies the shelf 14 and can be secured to the upper surface thereof by a suitable cement or the like, a flat inner wall 21 which extends vertically when the bladder is inflated, and a curved sidewall 36 which generally conforms to the inner surface of the cabin wall 11. The bladder also has flat end walls 37 that are shaped in conformity with its cross section. In addition, the bladder also has internal webs 38 which extend transversely across it at intervals along its length, like bulkheads, to insure that when inflated it will retain its shape, and which are particularly intended to assure the flatness and vertical orientation of the inner wall 21. These webs are apertured, as at 40, to provide for rapid and uniform dispersion of pressure gas all through the bladder.

In the normal collapsed condition of the bladder, its curved wall 36 is folded into pleats, as shown in FIG. 4, its inner wall 21 flatwise overlies these pleats, and a tough but supple cover 42 of leather or the like overlies the whole bladder for protection. The cover 42 has one marginal edge portion 44 which is permanently secured along the inner edge of the shelf 14 (preferably flatwise underlying it, as shown), as by means of a row of rivets 45. An opposite marginal edge portion 46 of the cover is flatwise secured to the inner surface of the cabin wall, extending lengthwise just above the collapsed bladder. The securement of this last-mentioned marginal edge portion 46 of the cover to the cabin wall should be one that is readily releasable under the force of bladder inflation, and is preferably effected by means of a strip of burred nylon cohesive material (Velcro) along said marginal edge portion of the cover, cooperating with a strip of similar material bonded to the inner surface of the cabin wall, as indicated at 49. When the bladder inflates and the connection 49 is broken, the cover 42 tends to be swung upwardly and laterally inwardly about its connection with the shelf, thereby imparting the desired lifting and inward motion to the airman's forearm. The cover is preferably flatwise adhered to the inner wall 21 of the bladder.

In the embodiment of the invention illustrated in FIG. 5 the source of pressure gas for inflation of the bladder is an electrically ignited cartridge 50 containing a charge of a solid combustible material that burns relatively slowly and with the lowest possible combustion gas temperature. It is of course ignited electrically upon closure of the handle actuated switch 27. As shown the cartridge 50 is mounted directly onto the bottom wall of the bladder so that combustion gases from the burning charge are fed directly into the bladder. However, in order to distribute the pressure gases through the whole bladder, and to absorb heat from them, there is a deflector 51 in the bladder into which the combustion gases flow from the cartridge and by which they are deflected laterally one or more times. The deflector 51 can comprise a tube having the cartridge 50 opening to its dial portion and having its axis transverse to the direction of gas flow out of the cartridge. In following a more or less tortuous path through the deflector, the combustion gases are caused to give up heat to its wall. Perforations 52 in the outer end portions of the deflector tube serve to diffuse and distribute the gases so that no intensive gas stream forcefully impinges a localized area of a bladder wall to impose an excessive stress upon the material thereof.

In the FIG. 5 embodiment the bladder is normally enclosed in a protective cover 42' of tough, supple material having side members 53 and a top member 54 which is connected with the side members by readily releasable connectors of Velcro or the like.

Figure 6:
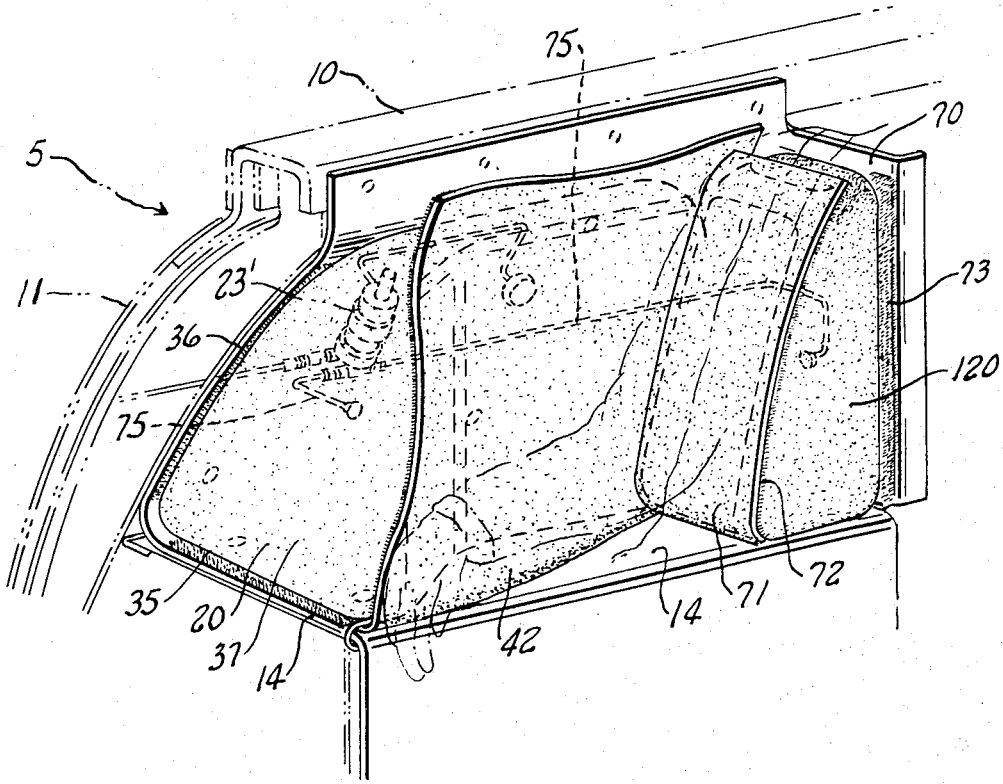
FIG. 6 is a perspective view of another modified embodiment of the invention shown in operative condition.

The embodiment of the invention illustrated in FIG. 6 is intended for an installation n which during normal flight an airman can get his elbow into the space between the backrest of the ejection seat and the wall 11 of the aircraft cabin. Merely swinging the forearm inwardly, or upwardly nd inwardly, does not serve to displace the elbow from that location, and consequently in that situation the elbow and upper arm could be pinched between the ejection seat and the canopy rails 10 as the seat moved upward during ejection.

As shown in FIG. 6, a second inflatable bladder 120 is located at each side of the ejection seat, generally rearwardly of the bladder 20 that provides for inward displacement of the seat occupant's forearm. The bladder 120 is arranged to move the seat occupant's elbow forwardly so that the bladder 20 that engages his forearm will effect an inward displacement of his entire arm.

The bladder 120 is located in front of a short, upright wall segment 70 beside the seat, projecting up from the shelf 14 and extending across substantially the full width of the shelf, which wall segment is directly behind the space in which the seat occupant tends to place his elbow and upper arm. The bladder 120, when collapsed, overlies the front face of the wall segment 70 to provide padding for the same. Overlying the collapsed bladder is a cover 71 having bands 72 of Velcro or the like along its upright marginal edges, normally engaging similar bands 73 along the upright marginal edge portions of the wall segment.

The bladder 120, when inflated, has the general shape of a truncated pyramid, so that its bottom projects farther forwardly than its top. Hence during inflation it is effective to impart a substantial forward motion to the seat occupant's arm, engaging it near the elbow to carry the elbow and forearm out of the space between the cabin wall and the backrest of the seat, to a position where the other bladder 20 can be effective to displace the entire arm inwardly.

In this case the bladder 20 that imparts sideward motion to the forearm tapers toward the cabin wall 11 at its rear end, where it is partly overlapped by the rear bladder 120.

Both bladders 20 and 120 can be inflated simultaneously, by means of branching ducts 75 connected with a common pressure gas source 23'. The rear bladder 120, having a substantially smaller volume than the side bladder 20, will inflate more rapidly so that the arm will be moved first forwardly and then laterally inwardly in one more or less continuous and rapid motion.

It will be apparent that other arrangements of plural bladders could be used to control the positioning of a seat occupant's body members in preparation for ejection, and to effect a sequence of different motions in the course of doing so, such sequencing being obtained either by the use of bladders of substantially different volumes, as just described, or by controlling the sequence of inflation of the bladders.

From the foregoing description taken with the accompanying drawings it will be apparent that this invention provides a normally unobtrusive protective device for the occupant of an airman's ejection seat whereby the limbs of the occupant are forcefully but gently moved to positions safe for ejection at a time prior to ejecting motion of the seat relative to the aircraft in which it is mounted, and it will be further apparent that during ejection the protective device of this invention prevents the airman from projecting any part of his body into a recess in the aircraft cabin where the body member might strike an overhanging part of the aircraft structure in the course of upward ejecting movement with the ejection seat.

Those skilled in the art will appreciate that the invention can be embodied in forms other than as herein disclosed for purposes of illustration.

The invention is defined by the following claims:

1. In an aircraft having an ejection seat adapted to be propelled along a defined substantially vertical path relative to the aircraft during ejection, and manually actuatable means for initiating seat ejection, said aircraft having a structural portion spaced to one side of said path but which overlies a zone normally occupied by a limb of an occupant of the ejection seat and from which zone said limb should be displaced prior to ejection so that said limb will clear a laterally inner edge of said structural portion, means for effecting such displacement of the seat occupant's limb, comprising:

a. an inflatable bladder of supple substantially gastight material in said zone, normally collapsed and, when inflated, being of a size and shape to fill said zone and to have a wall portion extending vertically downwardly from a line closely adjacent to said edge of said structural portion;

B. means providing a source of gas under pressure;

C. means connected with said manually actuatable means providing for rapid flow of pressure gas from said source to said inflatable cushion promptly upon actuation of said manually actuatable means; and D. means connected with said manually actuatable means for interposing a delay interval between actuation of said manually actuatable means and the commencement of seat ejecting motion to insure that the seat occupant's limb is out of said zone before the seat begins to move.

2. The structure of claim 1 further characterized in that when collapsed the inflatable bladder flatwise overlies a surface defining part of said zone.

3. The structure of claim 2 wherein said surface which the collapsed inflatable bladder overlies is horizontal and is at an elevation such that the collapsed bladder provides a comfortable arm rest for the occupant of the seat.

4. In an aircraft having an ejection seat and having cabin structure that defines a shelf at one side of the normal position of the ejection seat, which shelf has a lengthwise extending inner edge laterally adjacent to the ejection seat and is normally overlain by a forearm of the occupant of he ejection seat, said cabin structure also having a wall portion that extends upwardly from the outer edge of the shelf and laterally inwardly thereover to terminate at an edge of an opening through which the seat is ejectable, means for displacing the seat occupant's forearm off of said shelf in the event of seat ejection, to prevent its encounter with said wall portion, aid displacing means comprising;

A. an inflatable bladder of supple, substantially gastight material, normally in collapsed condition and overlying a portion of said shelf, said bladder having a shape and size, when inflated, to fill the space above the shelf and to have a wall portion thereof extending substantially vertically from near said inner edge of the shelf to near said edge of the opening;

B. means comprising a source of gas under pressure for rapidly inflating said bladder;

C. a supple but substantially tough cover member flatwise overlying and secured to said wall portion of the bladder and having opposite marginal edge portions which extend beyond the same;

D. means anchoring one of said marginal edge portions of the cover member to the structure of the aircraft along the inner edge of the shelf; and E. means normally readily releasably securing the other of said marginal edge portions of the cover member to said wall portion, along a portion thereof directly above the collapsed bladder, so that upon inflation of the bladder such securement is released and the cover member is moved upwardly and laterally inwardly.

* * * * *

UNITED STATES PATENT OFFICE
CERTIFICATE OF CORRECTION

Patent No. 3,630,472            Dated December 28, 1971

Inventor(s) Carl Evert Axenborg

It is certified that error appears in the above-identified patent and that said Letters Patent are hereby corrected as shown below:

Column 5 line 56; "dial" shuuld read --medial--

Claim 4 Column 8 line 5; "aid" should read --said--

Signed and sealed this 30th day of May 1972.

(SEAL)
Attest:

EDWARD M. FLETCHER, JR.         ROBERT GOTTSCHALK
Attesting Officer               Commissioner of Patents